United States Patent [19]

Sonnerat

[11] 4,434,985

[45] Mar. 6, 1984

[54] GASKET WITH METAL MOUNTING ARMATURE ROTATING BETWEEN COAXIAL PARTS

[75] Inventor: Claude Sonnerat, Annecy-le-Vieux, France

[73] Assignee: Societe Nouvelle de Roulements, Annecy, France

[21] Appl. No.: 377,838

[22] Filed: May 13, 1982

[30] Foreign Application Priority Data

May 13, 1981 [FR] France ............................ 81 09476

[51] Int. Cl.³ .......................... F16J 15/32; F16J 15/34
[52] U.S. Cl. ........................................ 277/37; 277/152
[58] Field of Search ................. 277/35, 36, 37, 39, 277/50

[56] References Cited

U.S. PATENT DOCUMENTS 2,240,252  4/1941  Bernstein .
3,108,815  10/1963  Haynie et al. ........................ 277/37
3,479,728  11/1969  Burfield et al. ...................... 277/39
4,049,281  9/1977  Bainard ............................... 277/37
4,311,346  1/1982  Danner ............................... 277/39

FOREIGN PATENT DOCUMENTS 1151415  7/1963  Fed. Rep. of Germany .
2296800  3/1975  France .
2430555  2/1980  France .

Primary Examiner—Robert I. Smith
Attorney, Agent, or Firm—Oblon, Fisher, Spivak, McClelland & Maier

[57] ABSTRACT

A gasket is disclosed having a lining (3) with watertight rims (4,5,8) in which lining is placed between two rings (2,6). A rim (8), which interlocks with the lining (3) attached to one of the rings (2 or 6), rests on the edge (7) of the other ring (6 or 2) so as to keep the two rings together while enclosing the lining.

1 Claim, 1 Drawing Figure

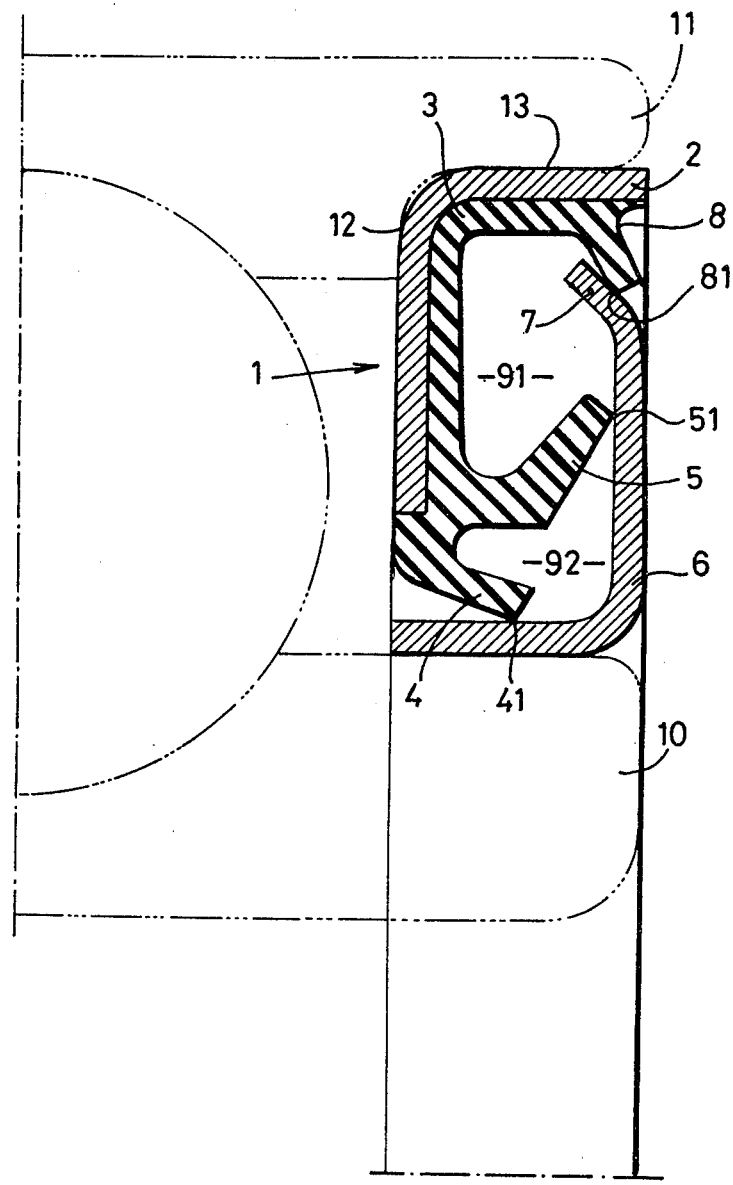

GASKET WITH METAL MOUNTING ARMATURE ROTATING BETWEEN COAXIAL PARTS

BACKGROUND OF THE INVENTION

1. Field of the Invention

The invention concerns a gasket rotating between coaxial parts of the type which includes a metal mounting armature formed of two rings with a generally L-shaped cross-section placed on the top and bottom respectively to form the seating for a catch rim lining which interlocks with one of the rings.

2. Description of the Prior Art

According to a known method of fabrication, one of the rings has an axial catch flange for the other ring formed after mounting of the seating. Such an assembly makes it possible to create a monobloc unit by forming the catch flange of one of the rings on the other during fabrication.

This production method for the ring with which the desired catch flange is formed makes is necessary to use an elaborated section whose configuration must allow for local deformation.

The gasket of the present invention makes it possible to eliminate this problem by integration of all functions at the level of the gasket itself.

SUMMARY OF THE INVENTION

Accordingly, one object of the present invention is to provide a watertight support rim which interlocks with the lining attached to one of the rings and which rests on the outside edge of the other ring so as to keep the two rings together by enclosing this lining.

The assembly of the present invention lends itself favorably to fabrication of a monobloc gasket whose constituent parts are assembled in such a way as to give it the ability to absorb alignment or concentricity faults in the two coaxial parts.

A further object of the present invention is to provide a gasket which can be used as a self-lubricating bearing between coaxial parts supporting very light loads which are thus supported elastically by the lining enclosed between the two rings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE details a cross-section of the rotating gasket.

DESCRIPTION OF THE PREFERRED EMBODIMENT

The rotating gasket represented is shown as it will appear once it has been mounted between two coaxial parts formed, to use a non-restrictive example, by the inner ring 10 and the outer ring 11 of a bearing, when the latter has a stopping shoulder 12 at the bottom of a mounting bore 13.

The rotating gasket 1 is composed of a metal mounting armature formed by an inverted outer ring 2 with a generally L-shaped cross-section which fits into the mounting bore 13 and rests against the shoulder 12 to define a chamber therebetween. On the ring 2 is molded a lining 3 with two main watertight rims, with one rim or lip 4 being radial and the other rim or lip 5 being axial. Both rims are in contact with an inner ring 6 with a generally L-shaped cross-section placed top to bottom in relation to the outer ring 2.

The inner ring 6, of which one flange extends radially toward the outer ring 2, has at the tip of this flange a slanted edge or end portion 7 tilted toward the part of ring 2 which is set in the mounting bore 13. A third watertight support rim 8 of the lining 3 rests on the slanted edge 7. This watertight support rim or lip 8 exerts axial force on the inner rim 6, which makes it difficult to separate the various elements of the gasket. The gasket formed in this way is ready for mounting, i.e., mounting is done simultaneously for the coaxial parts 10 and 11.

Thus, all the functional parts of the gasket, such as the lining 3 with rims 4, 5, and 8, and the surfaces in contact with these rims, are integrated and are not subject to the risk of deterioration following shocks or of pollution at the time of mounting.

The special positioning of the three watertight rims 4, 5, and 8 facilitates lubrication of these rims. The chambers or sub-chambers 91 and 92 which are formed, respectively, between axial rim 5 and support rim 8, and between axial rim 5 and radial rim 4, are greased so as to perfect lubrication of the respective lines of contact 41, 51 and 81 of the aforementioned rims 4, 5, and 8 with the inner ring 6.

This lubrication limits wear on the rims and prolongs the life of the gasket. Therefore, the grease used in the chambers 91 and 92 can be independent of the grease used to lubricate the coaxial parts. Thus, the lubricant can be chosen which is best suited to resolving a lead problem. For example, chamber 92 can be filled with a type of grease which ensures lubrication of rims 4 and 5, depending on the materials present and the utilization temperatures. The chamber 91 can be filled with a special grease which is resistant to external agents such as water or mud. This is of special interest when the gasket is being used on an automobile wheel bearing whose life and dependability are to be improved.

Therefore, the gasket according to the invention can be used advantageously in all cases where a rotating mechanical device is to be protected from the external environment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gasket for sealing between two relatively rotating parts, comprising:
   a first ring having an axis and being connected to one of said rotating parts, said first ring having an L-shaped cross section including a first radial leg and a first axial leg;
   a second ring coaxial with said first ring and being connected to the other of said rotating parts, said second ring having an L-shaped cross section including a second radial leg extending towards said first axial leg and a second axial leg extending axially towards said first radial leg, said second radial leg having a slanted distal end portion which deviates from the radial direction toward said first radial leg, said first and second rings enclosing a chamber;

a lining molded to the surface of said first ring which faces said second ring;

a first watertight lip extending from said lining and into contact with a first surface of said second axial leg;

a second watertight lip extending from said lining and into contact with a first surface of said second radial leg;

a third watertight lip extending from said lining and into contact with said slanted end portion at a second opposing surface of said second radial leg, whereby said third lip retains said second ring relative to said first ring and wherein said first, second and third lips, said lining and said rings together define two isolated sub-chambers of said chamber; and a lubricant filling each of said sub-chambers.

* * * * *